United States Patent [19]

Khurgin

[11] Patent Number: 4,896,931

[45] Date of Patent: Jan. 30, 1990

[54] FREQUENCY DOUBLING DEVICE

[75] Inventor: Jacob Khurgin, Ellicott City, Md.

[73] Assignee: North American Philips Corp., New York, N.Y.

[21] Appl. No.: 233,688

[22] Filed: Aug. 18, 1988

[51] Int. Cl.⁴ .......................... G02B 6/10; G02F 1/35
[52] U.S. Cl. .................................. 350/96.12; 307/427; 307/430
[58] Field of Search ............... 350/96.12, 96.13, 96.15, 350/96.29, 96.34; 307/425–430

[56] References Cited

U.S. PATENT DOCUMENTS

| | | |
|---|---|---|
| 3,384,433 | 5/1968 | Bloembergen . |
| 3,842,289 | 10/1974 | Yariv et al. ................ 307/88.3 |
| 3,988,593 | 10/1976 | Dewey, Jr. ................ 307/88.3 |
| 3,995,937 | 12/1976 | Baues et al. ................ 350/96.12 |
| 4,041,323 | 8/1977 | Stürmer ................ 307/425 |
| 4,221,981 | 9/1980 | Deserno ................ 307/425 |
| 4,427,260 | 1/1984 | Puech et al. ................ 350/96.14 |
| 4,749,245 | 6/1988 | Kawatsuki et al. ................ 350/96.12 |

FOREIGN PATENT DOCUMENTS

| | | |
|---|---|---|
| 0206220 | 12/1986 | European Pat. Off. . |
| 0254921 | 2/1988 | European Pat. Off. . |
| 2842330 | 4/1980 | Fed. Rep. of Germany . |
| 3335318 | 4/1984 | Fed. Rep. of Germany . |
| 3546239 | 12/1985 | Fed. Rep. of Germany . |
| 60-14222 | 1/1985 | Japan . |
| 60-57825 | 4/1985 | Japan . |
| 61-182027 | 8/1986 | Japan . |
| 61-239231 | 10/1986 | Japan . |
| 62-145227 | 6/1987 | Japan . |
| 62-262835 | 11/1987 | Japan . |
| 2187566 | 9/1987 | United Kingdom ................ 307/427 |

OTHER PUBLICATIONS

"Nonlinear Optical Effects in Rotationally-Twinned Crystals" C. Forbes Dewey, Jr.; Rev. de Phsique Applique, vol. 12, Feb. 1977, pp. 405–409.

"Second-Order Susceptibility of Asymmetric Coupled Quantum Well Structures", J. Khurgin; Appl. Phys. Letter 51(25), Dec. 1987, pp. 2100–2102.

Primary Examiner—John D. Lee
Assistant Examiner—Phan T. Heartney
Attorney, Agent, or Firm—William L. Botjer

[57] ABSTRACT

A device for doubling the frequency of electromagnetic radiation. The device includes a non-linear substrate having a non-linear optical waveguide of a differing refractive index disposed thereon. The waveguide layer includes an inverted polarization interface at which the direction of polarization of the waveguide abruptly changes in sign. Radiation directed across the device parallel to the plane of the inverted polarization interface will be doubled in frequency by the interface. The inverted polarization interface may be achieved in a number of ways. The interface may be directly grown on the substrate or a single layer waveguide may be cleaved and flipped over upon itself. Finally, the waveguide may be formed by the growth of asymmetric mirror image quantum wells on either side of a plane to form the interface.

9 Claims, 3 Drawing Sheets

FREQUENCY DOUBLING DEVICE

BACKGROUND OF THE INVENTION

This invention relates to nonlinear optical devices and more particularly to devices for doubling the frequency of electromagnetic radiation passing therethrough.

Optical digital data storage devices, such as compact discs, have come into widespread use. Typically, such discs are read and written to by means of a light emitted by a semiconductor laser (i.e. a laser diode). However, the light generated by semiconductor laser diodes generally falls within the lower end of the electromagnetic frequency spectrum (i.e. red or infrared). The use of higher frequency light, i.e. at the blue end of the spectrum, to read and write to optical storage medium would result in greatly increased storage density. Unfortunately, however, there are yet no practical blue semiconductor lasers. To date, the only blue lasers are large gas lasers which are obviously unsuitable for use in compact and inexpensive optical storage read/write devices.

Accordingly, a device capable of converting the light emitted by readily available semiconductor laser diodes to blue light is greatly desired. Laser diodes that emit infrared light are inexpensive and widely available. The frequency of blue light is twice that of infrared radiation. Accordingly, a device capable of doubling the frequency of infrared radiation it is greatly desired. The present invention is directed to providing an inexpensive frequency doubling device that may be used in conjunction with an infrared semiconductor laser to provide blue light suitable for use in reading and writing optical storage media.

The field of non-linear optics has provided a number of devices used as frequency doublers, generally through the means of second harmonic generation (SHG) of a fundamental frequency. U.S. Pat. No. 3,384,433 (Bloembergen) is directed to a non-linear device for converting light from first and second frequencies to a third different frequency. The device includes a series of non-linear crystals or slabs of material possessing specific lattice orientation periodically disposed along the axis of propagation of the two optical beams. Another device is described in the article entitled "Non-linear Optical Effects in Rotationally Twinned Crystals: An Evaluation of CdTe, ZnTe and ZnSe" in Revue De Physique Appliquee February 1977, Vol. 12, pages 405-409 and U.S. Pat. No. 3,988,593 (Dewey) which show devices achieving frequency doubling by passing a beam perpendicularly through a series of slabs of rotationally twinned crystals.

However, the above described approaches have suffered from a number of practical difficulties. These approaches require the frequency doubling device to have a large number (in some cases more than one hundred) of accurately grown slabs of crystals having precisely defined non-linear optical properties. The growth of such crystals is difficult and relatively expensive. Accordingly, a simpler, less expensive device for frequency doubling is desirable.

SUMMARY OF THE INVENTION

The present invention is directed to providing an inexpensive device and method for doubling the frequency of electromagnetic radiation. The device includes a non-linear substrate having a non-linear waveguide of a differing refractive index disposed thereon. The waveguide includes an inverted polarization interface at which the direction of polarization of the waveguide abruptly changes from positive to negative. Radiation is directed across the device parallel to the inverted polarization interface and is doubled in frequency by the interface.

The inverted polarization interface may be achieved in a number of ways. A first method is to grow a waveguide of a first polarity followed by the growth of a relatively thin layer of non-polarized material. Finally, a second layer of a polarization opposite to that of the first layer is grown. Another method of providing the inverted polarization interface is to simply grow a first layer of a waveguide polarized in a first direction on a substrate. Thereafter, the waveguide and substrate is cleaved and flipped over upon itself so that the waveguide layers lie in juxtaposed face-to-face relationship. In this relationship the polarization of the waveguide will be inverted along the plane of contact. Another method of providing an inverted polarization interface is through the growth of asymmetric mirror image quantum wells on each side of a plane. The polarity of the growth direction of the quantum wells is reversed at the plane forming the inverted polarization interface.

As can be appreciated, a frequency doubling device constructed in accordance with the present invention is advantageous in that the manufacturing complexity is greatly reduced because only a relatively few layers of crystal have to be grown. Contrast this to the multiple layer approaches of the prior art discussed above. Accordingly, the present invention lends itself to the large scale manufacture of relatively inexpensive frequency doubling devices for use in conjunction with semiconductor laser light sources in optical storage systems.

A device designed in accordance with the present invention is highly effective because the inverted polarization interface leads to the efficient coupling of power into the higher order harmonic mode. As a result, a large index step between the waveguide and the substrate is unnecessary for good frequency conversion efficiency. Accordingly, both the substrate and waveguide may be fabricated of structurally similar materials.

BRIEF DESCRIPTION OF THE DRAWINGS

For better understanding of the invention, reference is made to the following drawings, to be taken in conjunction with the detailed specification to follow.

DETAILED DESCRIPTION OF THE PREFERRED EMBODIMENT

Figure 1:
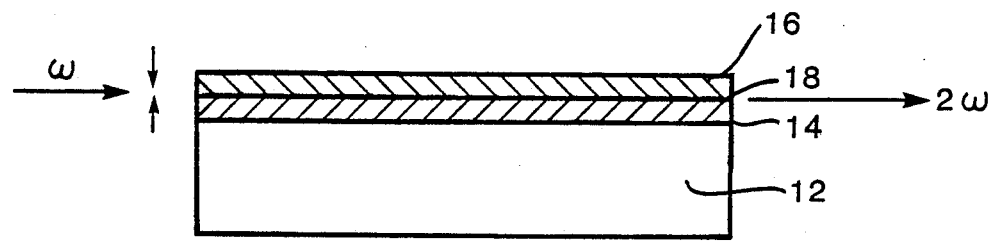
FIG. 1 is a sectional view of the non-linear optical frequency doubling device constructed in accordance with the present invention.

FIG. 1 illustrates a first embodiment of the inventive frequency doubling device 10. The frequency doubling device 10 comprises a substrate 12 which may be any suitable non-linear optical material such as potassium titanate phosphate ($KTiOPO_4$) known as "KTP", lithium niobate ($LiNbO_3$) or zinc selenide (ZnSe). On substrate 12 is disposed a waveguide layer 14 of, for example, zinc selenide or zinc sulfur selenide ($ZnS_xSe_{1-x}$). As shown in FIG. 1 layer 14 has an optical activity dipole facing up and has an index of refraction greater than that of substrate 12 so as to form a waveguide. Because of the construction of the present device, it is not necessary that the difference in indices of refraction of the substrate and waveguide be great. By way of example only, index differences of only 0.13 for the fundamental frequency and 0.18 for the harmonic frequency have been found effective. Disposed on waveguide layer 14 is a second waveguide layer 16 whose optical activity dipole is opposite that of waveguide layer 14. This orientation of layers having opposed optical activity dipoles provides a "twin plane" or an "inverted polarization interface 18 between the layers.

As shown in FIG. 1 by the arrows, the dipole abruptly changes direction at the interface. Light of a fundamental frequency $\omega$ enters the device parallel to the plane of the inverted polarization interface 18. The effect of interface 18 is such that second harmonic generation is caused. The inverted polarization interface 18 causes the positive (or negative) going half of the sinusoidal electromagnetic wave traveling along interface 18 to be inverted causing a doubling in frequency. The thickness of waveguide layers 14 and 16 are adjusted in a known manner (see for example the technique described in P. K. Tien, *Applied Optics*, Vol. 10, p. 2395 (1981)) so that phase matching occurs between the input and output radiation. The light exiting the device is therefore twice the frequency ($2\omega$) of the light entering the device.

Molecular beam epitaxy (MBE) has permitted the growth of crystal structures of great complexity in extremely thin layers. The waveguide layers 14, 16 may be grown by this technique. In order to produce the device of FIG. 1 the layer 14 of non-linear optical material such as ZnSe or other material is grown on substrate 12 by MBE and will accordingly have a first polarity. Thereafter, a relatively thin layer of non-polarized material, such as germanium (Ge) is grown on layer 14. Finally, another layer of the zinc selenide is grown on the germanium layer to form the second waveguide layer 16. When this second zinc selenide layer is grown there is a 50% probability that the polarization of the second layer 16 will be opposite to that of the first layer 14 which provides the required inverted polarization interface. If the polarization of the second layer is the same as the first layer, which is also a 50% probability, the inverted polarization interface will not have been achieved and the device will be inoperative and should be discarded. The non-polarized layer of germanium has no effect on the operation of the device since the thickness of this layer is relatively small when compared to the wavelength of light in question.

Figure 2:
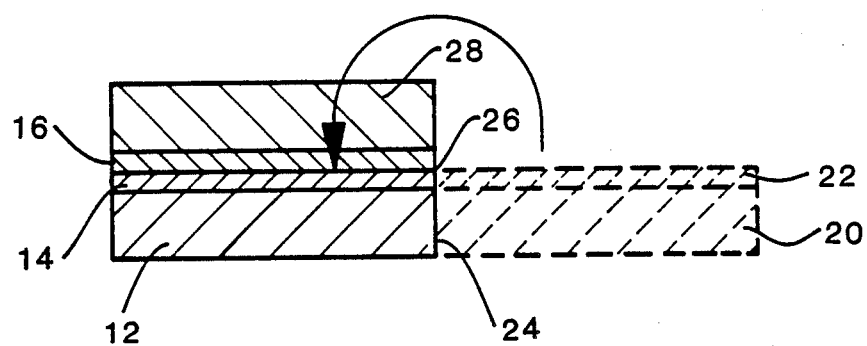
FIG. 2 illustrates a method of manufacture of the frequency doubling non-linear optical device.

FIG. 2 illustrates a relatively simple method for achieving the inverted polarization interface required. By these means, a waveguide layer 22 is provided on a substrate 20 by proton bombardment is ion exchange. Substrate 20 is thereafter cleaved along a line 24 perpendicular to the waveguide layer 22 and substrate 20. After cleaving, the substrate and waveguide layer is flipped over upon itself as shown. The physical reversal of the waveguide layer 22 upon itself creates an inverted polarization interface 26 along the plane of contact. The upper portion 28 of the substrate 20 is unnecessary and can be removed.

Figure 3:
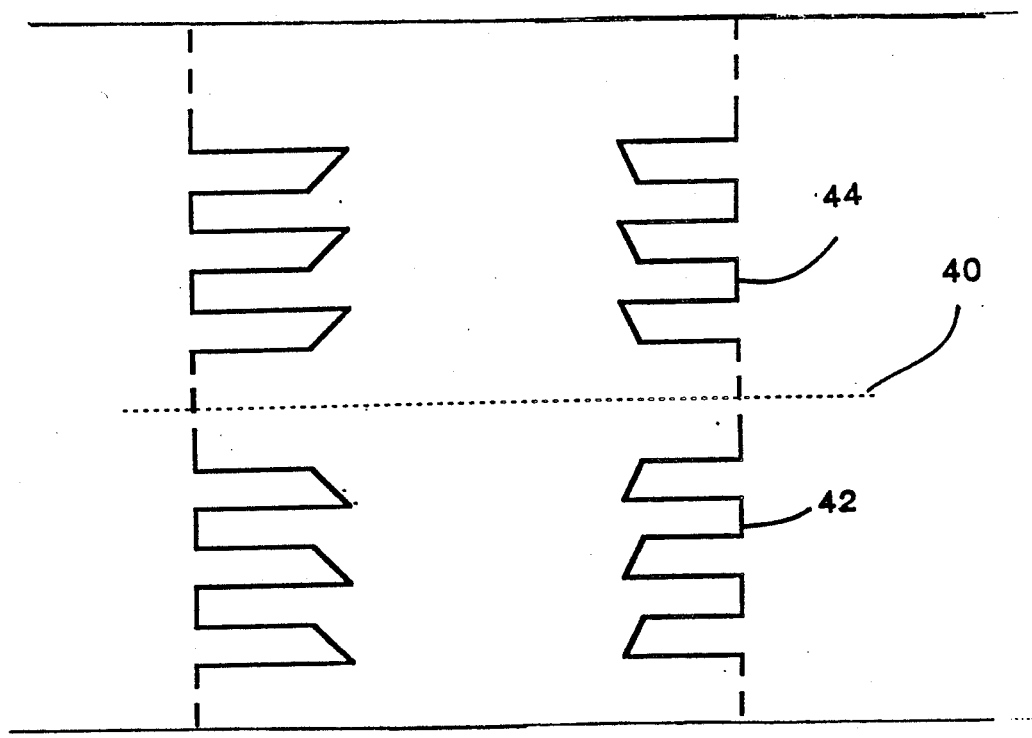
FIG. 3 is a schematic diagram of the inverted polarization interface of the present invention as embodied in an asymmetric mirror image quantum well structure.

FIG. 3 illustrates yet another means for providing the inverted polarization interface in the waveguide layer 16 by means of asymmetric quantum wells, grown with the polarity of the growth direction inverted to form the interface. As shown in FIG. 3 an inverted polarization plane 40 is formed between a lower portion of quantum wells 42 and an upper portion of quantum wells 44. As shown in FIG. 3 the lower 42 and upper 44 asymmetric quantum wells are mirror images of one another along plane 40. Such mirror image asymmetric quantum wells may be readily grown by MBE processes.

The present application is not limited to only the generation of blue light from infrared light. Rather, the frequency doubling device is applicable to doubling the frequency of a fairly wide range of electromagnetic radiation. Devices for different frequencies will utilize active layers of different materials. For example, the infrared to blue conversion is achieved with materials of the II-VI family. Similarly materials in the III-V family such as gallium arsenide (GaAs) may be utilized for the generation of red light from input frequency of half that. As those skilled in the art will appreciate, a selection of materials and film thicknesses can provide frequency doubling for whatever output frequency is desired.

Although the present invention has been described in conjunction with the preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. A frequency doubling device comprising:
   (a) a non-linear optical substrate;
   (b) a non-linear optical waveguide disposed on said substrate, said waveguide having a refractive index differing from that of said substrate;
   (c) said non-linear waveguide having an inverted polarization interface disposed therein; and
   (d) means for directing electromagnetic radiation across said waveguide in a direction parallel to said inverted polarization interface.

2. The frequency doubling device as claimed in claim 1 wherein said inverted polarization interface is formed by face to face juxtaposition of first and second waveguide layers having opposed polarization dipoles.

3. The frequency doubling device as claimed in claim 1 wherein said inverted polarization interface is formed by growing a waveguide of a first polarity and thereafter growing a waveguide of a second opposite polarity.

4. The frequency doubling device as claimed in claim 3 further including a relatively thin layer of neutral polarity material disposed between said first and second polarity waveguides.

5. The frequency doubling device as claimed in claim 1 wherein said inverted polarization interface comprises asymmetric mirror image quantum wells disposed about said inverted polarization plane.

6. The frequency doubling device as claimed in claim 1 wherein said waveguide is formed from zinc selenide.

7. The frequency doubling device as claimed in claim 1 wherein said waveguide layer is formed from zinc sulfur selenide of the formula $ZnS_xSe_{1-x}$.

8. The frequency doubling device as claimed in claim 1 wherein said substrate comprises KTP.

9. A method for doubling the frequency of electromagnetic radiation comprising the steps of:
   (a) providing a non-linear waveguide disposed on a substrate, said waveguide including an inverted polarization interface; and
   (b) passing the electromagnetic radiation to be doubled in a direction parallel to said inverted polarization interface.

* * * * *